United States Patent
Yang et al.

(10) Patent No.: US 10,823,911 B2
(45) Date of Patent: Nov. 3, 2020

(54) ANTI-CRACKING PANDA-TYPE POLARIZATION-MAINTAINING OPTICAL FIBER

(71) Applicant: YANGTZE OPTICAL FIBRE AND CABLE JOINT STOCK LIMITED COMPANY, Hubei (CN)

(72) Inventors: Kun Yang, Hubei (CN); Weijun Tong, Hubei (CN); Beibei Cao, Hubei (CN); Wu Yang, Hubei (CN); Gaoqing Lei, Hubei (CN); Xinben Zhang, Hubei (CN); Zhendong Wang, Hubei (CN); Wei Zheng, Hubei (CN); Yilin Tong, Hubei (CN)

(73) Assignee: YANGTZE OPTICAL FIBRE AND CABLE JOINT STOCK LIMITED COMPANY, Hubei (CN)

( * ) Notice: Subject to any disclaimer, the term of this patent is extended or adjusted under 35 U.S.C. 154(b) by 0 days.

(21) Appl. No.: 16/334,103

(22) PCT Filed: Sep. 19, 2017

(86) PCT No.: PCT/CN2017/101991
§ 371 (c)(1),
(2) Date: Mar. 18, 2019

(87) PCT Pub. No.: WO2018/050106
PCT Pub. Date: Mar. 22, 2018

(65) Prior Publication Data
US 2020/0018896 A1  Jan. 16, 2020

(30) Foreign Application Priority Data
Sep. 19, 2016 (CN) .......................... 2016 1 0831262

(51) Int. Cl.
*G02B 6/036* (2006.01)
*G02B 6/024* (2006.01)
*G02B 6/028* (2006.01)

(52) U.S. Cl.
CPC .......... *G02B 6/03694* (2013.01); *G02B 6/024* (2013.01); *G02B 6/028* (2013.01)

(58) Field of Classification Search
CPC ..... G02B 6/03694; G02B 6/024; G02B 6/028
See application file for complete search history.

(56) References Cited

U.S. PATENT DOCUMENTS 5,024,501 A * 6/1991 Taya ..................... G02B 6/2843
385/11
6,671,444 B1 * 12/2003 Arai ................... G02B 6/02004
385/122

(Continued)

FOREIGN PATENT DOCUMENTS

| CN | 104714272 A | 6/2015 |
| CN | 204575890 U | 8/2015 |

(Continued)

OTHER PUBLICATIONS

State Intellectual Property Office of People's Republic of China, "International Search Report for PCT Application No. PCT/CN2017/101991", China, dated Oct. 31, 2017.

*Primary Examiner* — Chris H Chu
(74) *Attorney, Agent, or Firm* — Tim Tingkang Xia, Esq.; Locke Lord LLP

(57) ABSTRACT

An anti-cracking panda-type polarization-maintaining optical fiber includes a cladding layer, stress layers, and a fiber core. The fiber core is located in the center of the cladding layer. The stress layers are located symmetrically at two sides of the fiber core with a distance away from the fiber core and are located within the cladding layer. Each stress layer is enclosed at edges of their outer sides by a transition (Continued)

layer with a gradient refractive index. By providing the transition layer with the gradient refractive index at the edge of the outer side of the stress layer, the pressure stress at the edge of the stress layer is decomposed and released, so as to avoid cracks at the edge of the polished stress layer on the end of the optical fiber, and thus optimizes the performance of the polarization-maintaining optical fiber by decreasing the room temperature polishing cracking rate.

6 Claims, 2 Drawing Sheets

(56) References Cited

U.S. PATENT DOCUMENTS

| | | | |
|---|---|---|---|
| 2005/0213907 A1* | 9/2005 | Hiroishi | G02B 6/0281 385/123 |
| 2008/0095199 A1* | 4/2008 | Abramczyk | G02B 6/105 372/6 |
| 2017/0139129 A1* | 5/2017 | Luo | C03B 37/01217 |

FOREIGN PATENT DOCUMENTS

| | | |
|---|---|---|
| CN | 105278032 A | 1/2016 |
| CN | 205229511 U | 5/2016 |
| CN | 105700070 A | 6/2016 |
| CN | 106291807 A | 1/2017 |
| JP | 2005164938 A | 6/2005 |

* cited by examiner

ANTI-CRACKING PANDA-TYPE POLARIZATION-MAINTAINING OPTICAL FIBER

CROSS-REFERENCE TO RELATED APPLICATIONS

This application is a U.S. national stage application of PCT Patent Application Serial No. PCT/CN2017/101991, filed Sep. 17, 2017, which itself claims priority to Chinese Patent Application No. 201610831262.1, filed Sep. 19, 2016 in the State Intellectual Property Office of P.R. China, which are hereby incorporated herein in their entireties by reference.

FIELD OF THE INVENTION

The present disclosure relates to an anti-cracking panda-type polarization-maintaining optical fiber used for optical communication and sensing, and it belongs to the technical field of special optical fibers.

BACKGROUND OF THE INVENTION

Polarization-maintaining optical fiber is a kind of special optical fibers. It is an optical fiber capable of maintaining a linear polarization of light transmitting through it. Polarization-maintaining optical fiber can be used in many fields such as multiplex coherent communication, fiber optic gyroscopes, fiber optic hydrophones, polarization sensing, etc. It is a valuable special optical fiber having wide applications.

Polarization-maintaining optical fibers can be categorized into two types: geometrical birefringent and stress birefringent. An example of geometrical birefringent polarization-maintaining optical fiber is elliptical core polarization-maintaining optical fiber whose fiber core is elliptical and whose geometrical asymmetry can be used to produce birefringence. Examples of stress birefringent polarization-maintaining optical fiber are bow-tie polarization-maintaining optical fiber, panda-type polarization-maintaining optical fiber, and elliptical cladding polarization-maintaining optical fiber, in which a high expansion coefficient stress layer is introduced into the cladding layer to exert a stress pressure on the fiber core, thereby producing birefringence.

Among the abovementioned stress birefringent polarization-maintaining optical fibers, panda-type polarization-maintaining optical fiber is the most widely used one. A panda-type polarization-maintaining optical fiber includes a fiber core, stress layers, and a cladding layer. The fiber core is located at the central part of the cladding layer, and two cylindrical stress layers are located at two sides of the fiber core. The fiber core is usually made of germanium-fluorine-doped silica glass. The stress layers are usually made of boron-doped silica glass. The cladding layer is usually made of pure silica glass. Because boron-doped silica glass has a better thermal expansion property than pure silica glass, the stress layers can induce pressure stress on the fiber core, thereby producing said stress birefringence and thus enabling the optical fiber to have the capability of maintaining a linear polarization.

Polarization-maintaining optical fibers used for components have advantages such as high strength and steady crosstalk. With the development of polarization-maintaining optical fiber related communication components, there is a dramatically increasing demand for polarization-maintaining optical fibers used for components. However, because of unreasonable designs of stress layers in the existing panda-type polarization-maintaining optical fibers, there are always cracks at edges of polished stress layers on ends of optical fibers, which leads to undesirable polarization-maintaining optical fibers.

SUMMARY OF THE INVENTION

The present disclosure aims to provide an improved structure design with respect to the abovementioned shortcomings of the existing technology, so as to provide an anti-cracking panda-type polarization-maintaining optical fiber that meets requirements for polarization-maintaining optical fiber used in components.

To solve the above problem, the present disclosure provides the following technical solution. An anti-cracking panda-type polarization-maintaining optical fiber comprises a cladding layer, stress layers, and a fiber core. The fiber core is located in the center of the cladding layer. The stress layers are located symmetrically at two sides of the fiber core with a distance away from the fiber core and are located within the cladding layer. The stress layers each are enclosed at edges of their outer sides by a transition layer with a gradient refractive index.

According to the above solution, the transition layer with the gradient refractive index has a single-layer thickness d ranging from 1 μm to 4 μm, and has a relative refractive index gradually decreasing from outside to inside.

According to the above solution, the transition layer with the gradient refractive index has a minimum relative refractive index ranging from −0.1% to −0.2%.

According to the above solution, the transition layer with the gradient refractive index has a minimum relative refractive index ranging from −0.4% to −0.7%.

According to the above solution, the transition layer with the gradient refractive index has a maximum relative refractive index ranging from 0% to −0.1%.

According to the above solution, the transition layer with the gradient refractive index is a boron-doped silica glass layer.

According to the above solution, the stress layers are boron-doped silica glass layers, and each of the stress layers has a diameter D ranging from 30 μm to 40 μm and a relative refractive index Δ1% ranging from −0.4% to −0.7%.

According to the above solution, the relative refractive index of the transition layer with the gradient refractive index gradually decreases from outside to inside in a gradient manner, or following the shape of an arc, or in a linear manner.

According to the above solution, the fiber core is a germanium-doped or germanium-fluorine-doped silica glass layer, and the fiber core has a diameter a ranging from 5 μm to 10 μm and a relative refractive index Δ2% ranging from 0.2% to 0.5%.

According to the above solution, the cladding layer is a pure silica glass layer and has a diameter ranging from 79 μm to 126 μm.

According to the above solution, the outer cladding layer of the optical fiber is coated on its outside with a coating layer which includes, from inside to outside, an inner coating layer and an outer coating layer. A difference between a diameter D1 of the inner coating layer and a diameter D2 of the outer cladding layer, namely D2-D1, is in a range from 30 μm to 90 μm. A highest temperature that the inner coating layer can withstand is from 80° C. to 110° C., and a highest temperature that the outer coating layer can withstand is from 80° C. to 110° C.

The beneficial effects of the present disclosure are as follows. By providing the transition layer with the gradient refractive index at edges of the outer sides of the stress layers, the pressure stresses at the edges of the stress layers can be decomposed and released, which helps to avoid cracks at the edges of the polished stress layers on the end of the optical fiber, and thus optimizes the performance of the polarization-maintaining optical fiber by decreasing the room temperature polishing cracking rate from the undesired 30% to the improved 0.1%. The optical fiber cracking rate under temperature cycle is decreased from undesired 50% to the improved 0.3%. Panda-type polarization-maintaining optical fiber produced for components would thus have improved properties and better reliability and can be used in adverse working environments.

DETAILED DESCRIPTION OF THE EMBODIMENTS

Figure 1:
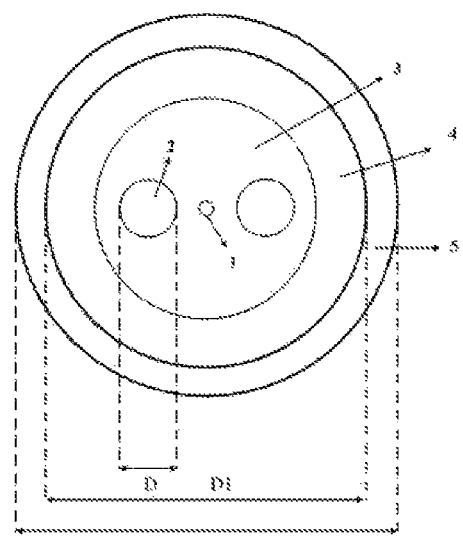
FIG. 1 schematically shows structure of an optical fiber in its radial direction according to one embodiment of the present disclosure.
Figure 2:
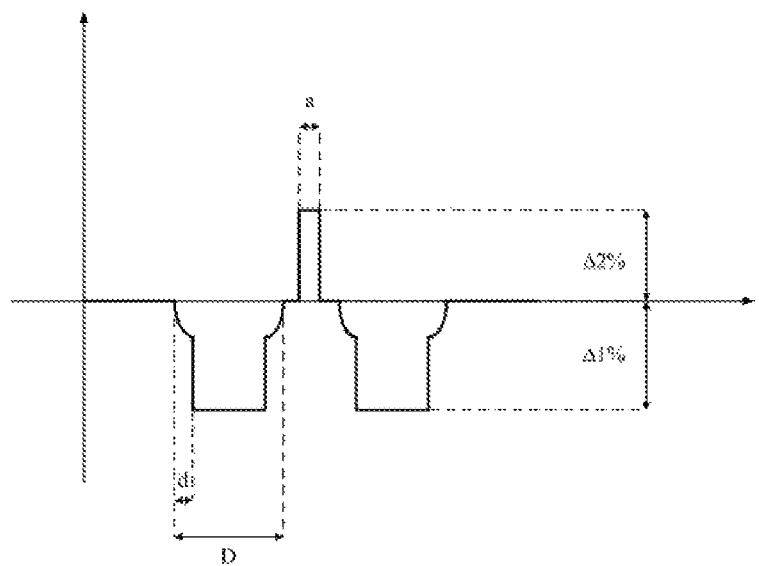
FIG. 2 schematically shows refractive index profile of an optical fiber according to embodiment 1 of the present disclosure.
Figure 3:
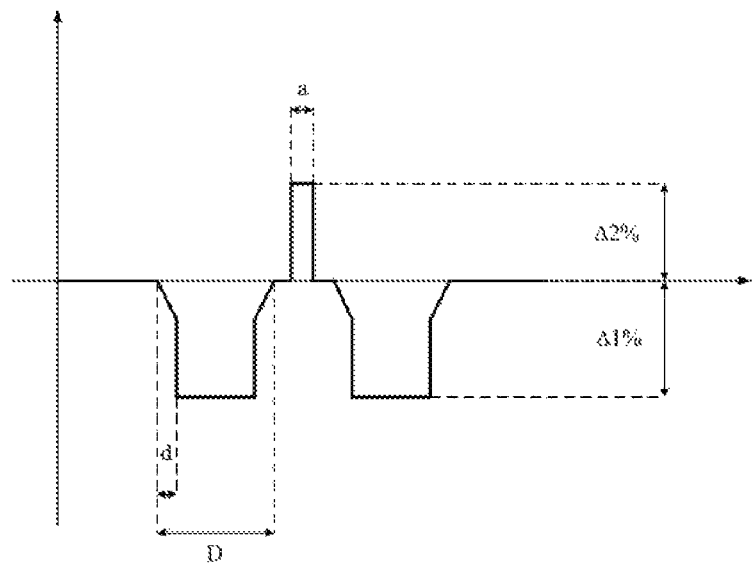
FIG. 3 schematically shows refractive index profile of an optical fiber according to embodiment 2 of the present disclosure.
Figure 4:
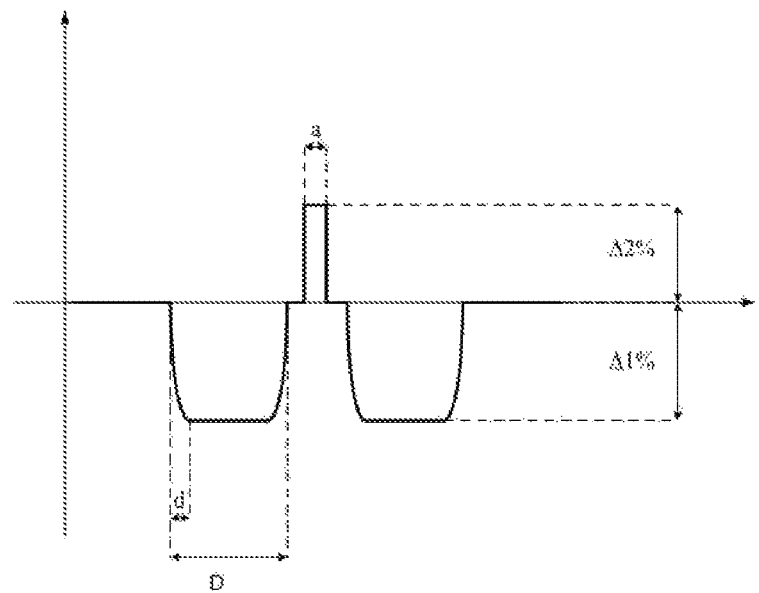
FIG. 4 schematically shows refractive index profile of an optical fiber according to embodiment 3 of the present disclosure.

The present disclosure will be explained further in details with reference to the embodiments.

An optical fiber includes a cladding layer 3, stress layers 2, and a fiber core 1. The fiber core is located at the center of the cladding layer. The fiber core is a germanium-doped or germanium-fluorine-doped silica glass layer. The fiber core has a diameter a ranging from 5 μm to 10 μm, and has a relative refractive index (relative to the refractive index of pure silica) Δ2% ranging from 0.2% to 0.5%. The stress layers are located symmetrically at two sides of the fiber core with a distance away from the fiber core and are located within the cladding layer. The stress layers are boron-doped silica glass layers. The stress layers each have a diameter D of 36 μm, and have a relative refractive index (relative to the refractive index of pure silica) Δ1% of −0.5%. The stress layers each are enclosed at edges of their outer sides by a transition layer with a gradient refractive index. The transition layer with the gradient refractive index is a boron-doped silica glass layer and has a single-layer thickness d of 2.5 μm. The transition layer has a relative refractive index gradually decreasing from outside to inside following the shape of an arc or in a linear manner, and has a minimum relative refractive index of −0.12% and a maximum relative refractive index of −0.01%, or a minimum relative refractive index of −0.5% and a maximum relative refractive index of 0%. The cladding layer is a pure silica glass layer and has a diameter ranging from 79 μm to 126 μm. An outer cladding layer of the optical fiber is coated on its outside with a coating layer. The coating layer comprises, from inside to outside, an inner coating layer 4 and an outer coating layer 5. A difference between a diameter D1 of the inner coating layer and a diameter D2 of the outer cladding layer, namely D2−D1, is 50 μm. The highest temperature that the inner coating layer can withstand is from 80° C. to 110° C. The highest temperature that the outer coating layer can withstand is from 80° C. to 110° C. The screening intensity of the optical fiber is 100 kpsi, and the minimum bending radius thereof is 10 mm.

Main properties of the optical fiber are shown in Table 1.

Parameters for room temperature polishing are as follows. The polishing process comprised loading an adhesive and polishing. The step of loading the adhesive involved gradient heating and cooling. The process of polishing all sample optical fibers included: loading the adhesive, stripping the optical fiber, inserting the optical fiber, heating, and then curing the optical fiber together with a connector ferrule for a first time. The step of curing was to heat directly in a curing oven with temperature increasing at a rate of 1° C./30 s from room temperature gradually to 80° C. The heating lasted for 0.5 h.

After curing of the samples by heating, polishing was carried out as with polishing of an ordinary connector. The polishing process included removing the adhesive, coarse polishing, fine polishing, and finishing polishing. During the polishing process, deionized water could be added as a buffer solution for polishing. There were no cracks at the polished stress layer on the end of the optical fiber.

TABLE 1

| Main properties of the optical fiber. Parameters of Polarization-Maintaining Optical Fiber | |
|---|---|
| Model | PM1310/125-13/250 |
| Type | PM 1016-C |
| Cut-off Wavelength (nm) | 1230.00 |
| Model Field Diameter (μm) | 9.00 |
| Attenuation Coefficient (dB/km) | 0.46 |
| Beat Length (mm) | 3.10 |
| Diameter of Cladding Layer (μm) | 124.70 |
| Diameter of Optical Fiber (μm) | 245.00 |
| Eccentricity (μm) | 0.13 |
| Crosstalk (dB/100 m) | −37.00 |
| Screening Intensity GN/m2 (kpsi) | 0.70 (100) |

What is claimed is:

1. An anti-cracking panda-type polarization-maintaining optical fiber, comprising: a cladding layer, stress layers, and a fiber core, wherein
   the fiber core is located in a center of the cladding layer,
   the stress layers are located symmetrically at two sides of the fiber core with a distance away from the fiber core and are located within the cladding layer, and
   the stress layers each are enclosed at edges of their outer sides by a transition layer with a gradient refractive index, wherein the transition layer with the gradient refractive index has a relative refractive index gradually decreasing from outside to inside, and the relative refractive index has a minimum relative refractive index ranging from −0.1% to −0.2%, or ranging from −0.4% to −0.7%,
   wherein the transition layer with the gradient refractive index has a maximum relative refractive index ranging from 0% to −0.1%, and
   wherein the stress layers are boron-doped silica glass layers, and each of the stress layers has a diameter D ranging from 30 μm to 40 μm and a relative refractive index Δ1% ranging from −0.4% to −0.7%.

2. The anti-cracking panda-type polarization-maintaining optical fiber according to claim 1, wherein the transition layer with the gradient refractive index has a single-layer thickness d ranging from 1 μm to 4 μm.

3. The anti-cracking panda-type polarization-maintaining optical fiber according to claim 1, wherein the transition layer with the gradient refractive index is a boron-doped silica glass layer.

4. The anti-cracking panda-type polarization-maintaining optical fiber according to claim 1, wherein the relative refractive index of the transition layer with the gradient refractive index gradually decreases from outside to inside in a gradient manner, or following the shape of an arc, or in a linear manner.

5. The anti-cracking panda-type polarization-maintaining optical fiber according to claim 1, wherein
- the fiber core is a germanium-doped or germanium-fluorine-doped silica glass layer, and the fiber core has a diameter a ranging from 5 μm to 10 μm and a relative refractive index Δ2% ranging from 0.2% to 0.5%, and
- the cladding layer is a pure silica glass layer and has a diameter ranging from 79 μm to 126 μm.

6. The anti-cracking panda-type polarization-maintaining optical fiber according to claim 1, wherein the cladding layer of the optical fiber is coated on its outside with a coating layer which includes, from inside to outside, an inner coating layer and an outer coating layer,
- wherein a difference between a diameter D1 of the inner coating layer and a diameter D2 of the outer cladding layer, namely D2-D1, is in a range from 30 μm to 90 μm, and
- wherein a highest temperature that the inner coating layer can withstand is from 80° C. to 110° C., and a highest temperature that the outer coating layer can withstand is from 80° C. to 110° C.

* * * * *